US011405263B2

(12) United States Patent
Stenberg et al.

(10) Patent No.: US 11,405,263 B2
(45) Date of Patent: Aug. 2, 2022

(54) USING SELF-OPERATION CASES TO IDENTIFY AND RESOLVE ISSUES CAUSING NETWORK SLICE RESELECTION

(71) Applicant: NOKIA SOLUTIONS AND NETWORKS OY, Espoo (FI)

(72) Inventors: Kaj Peter Stenberg, Sundsberg (FI); Haitao Tang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/966,283

(22) PCT Filed: Feb. 2, 2018

(86) PCT No.: PCT/EP2018/052652

§ 371 (c)(1),
(2) Date: Jul. 30, 2020

(87) PCT Pub. No.: WO2019/149368

PCT Pub. Date: Aug. 8, 2019

(65) Prior Publication Data

US 2020/0374181 A1 Nov. 26, 2020

(51) Int. Cl.
*H04L 41/0654* (2022.01)
*G06K 9/62* (2022.01)
(Continued)

(52) U.S. Cl.
CPC ........ *H04L 41/0672* (2013.01); *G06K 9/6215* (2013.01); *H04L 43/0888* (2013.01);
(Continued)

(58) Field of Classification Search
None
See application file for complete search history.

(56) References Cited

U.S. PATENT DOCUMENTS 9,386,001 B1 7/2016 Marquardt
2016/0226913 A1* 8/2016 Sood .................. H04L 63/1425
(Continued)

FOREIGN PATENT DOCUMENTS

WO WO 2016/150627 A1 9/2016
WO WO 2016/192639 A1 12/2016
(Continued)

OTHER PUBLICATIONS

"3rd Generation Partnership Project; Technical Specification Group Services and System Aspects; Procedures for the 5G System; Stage 2 (Release 15)" 3GPP TS 23.502 v 15.0.0 (Dec. 2017), 258 pages.
(Continued)

*Primary Examiner* — Andre Tacdiran
(74) *Attorney, Agent, or Firm* — Alston & Bird LLP

(57) ABSTRACT

A database stores self-operation cases for slice reselection requests received by a network function virtualization (NFV) system. The self-operation cases include reasons, contexts, remedial actions, and results of the remedial actions for the slice reselection requests. A set of detection rules identifies at least one issue causing the slice reselection requests based on reasons for the slice reselection requests and contexts of the slice reselection requests. The set of detection rules are applied to the self-operation cases to identify the at least one issue and a remedial action is selected to address the at least one issue. The remedial action is performed to reconfigure the NFV system and the processor determines whether the remedial action successfully resolved the at least one issue. Setting status flags for affected cells or slices prevents slice reselections to the affected cells or slices until the at least one issue is resolved.

20 Claims, 6 Drawing Sheets

(51) Int. Cl.

| | |
|---|---|
| ***H04L 43/0888*** | (2022.01) |
| ***H04W 24/02*** | (2009.01) |
| ***H04W 24/04*** | (2009.01) |
| ***H04W 24/08*** | (2009.01) |
| ***H04W 48/18*** | (2009.01) |

(52) U.S. Cl.

CPC ........... *H04W 24/02* (2013.01); *H04W 24/04* (2013.01); *H04W 24/08* (2013.01); *H04W 48/18* (2013.01)

(56) References Cited

U.S. PATENT DOCUMENTS

2018/0077024 A1* 3/2018 Zhang ................. H04L 41/0896
2018/0307538 A1* 10/2018 Meng ...................... H04L 12/46

FOREIGN PATENT DOCUMENTS

WO WO 2016/192746 A1 12/2016
WO WO 2018/206839 A1 11/2018
WO WO 2019/037849 A1 2/2019

OTHER PUBLICATIONS

"3rd Generation Partnership Project; Technical Specification Group Services and System Aspects; Study on Architecture for Next Generation System (Release 14)" 3GPP TR 23.799 v14.0.0 (Dec. 2016), 522 pages.

"3rd Generation Partnership Project; Technical Specification Group Services and System Aspects; System Architecture for the 5G System; Stage 2 (Release 15)" 3GPP TS 23.501 v15.0.0 (Dec. 2017), 181 pages.

International Search Report and Written Opinion for Application No. PCT/EP2018/052652 dated Sep. 28, 2018, 12 pages.

Office Action for Indian Application No. 202047037545 dated Nov. 26, 2021, 5 pages.

Office Action for European Application No. 18703744.5 dated Jul. 28, 2021, 4 pages.

Office Action for European Application No. 18703744.5 dated Apr. 28, 2022, 4 pages.

* cited by examiner

USING SELF-OPERATION CASES TO IDENTIFY AND RESOLVE ISSUES CAUSING NETWORK SLICE RESELECTION

CROSS-REFERENCE TO RELATED APPLICATIONS

This application is a national phase entry of International Application No. PCT/EP2018/052652, filed Feb. 2, 2018, the entire contents of which are incorporated herein by reference.

BACKGROUND

Network function virtualization (NFV) is used to provide virtual network functions using shared hardware resources of an NFV infrastructure. For example, a typical NFV architecture includes computing hardware, storage hardware, and network hardware. A virtualization layer provides an abstract representation of the hardware resources. The hardware resources and the virtualization layer implement virtual resources including virtual computing resources, virtual storage resources, and virtual networking resources. Virtual networking functions are implemented using the virtual resources. In some cases, the virtual networking functions are used to implement network slices that provide services to one or more user equipment.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
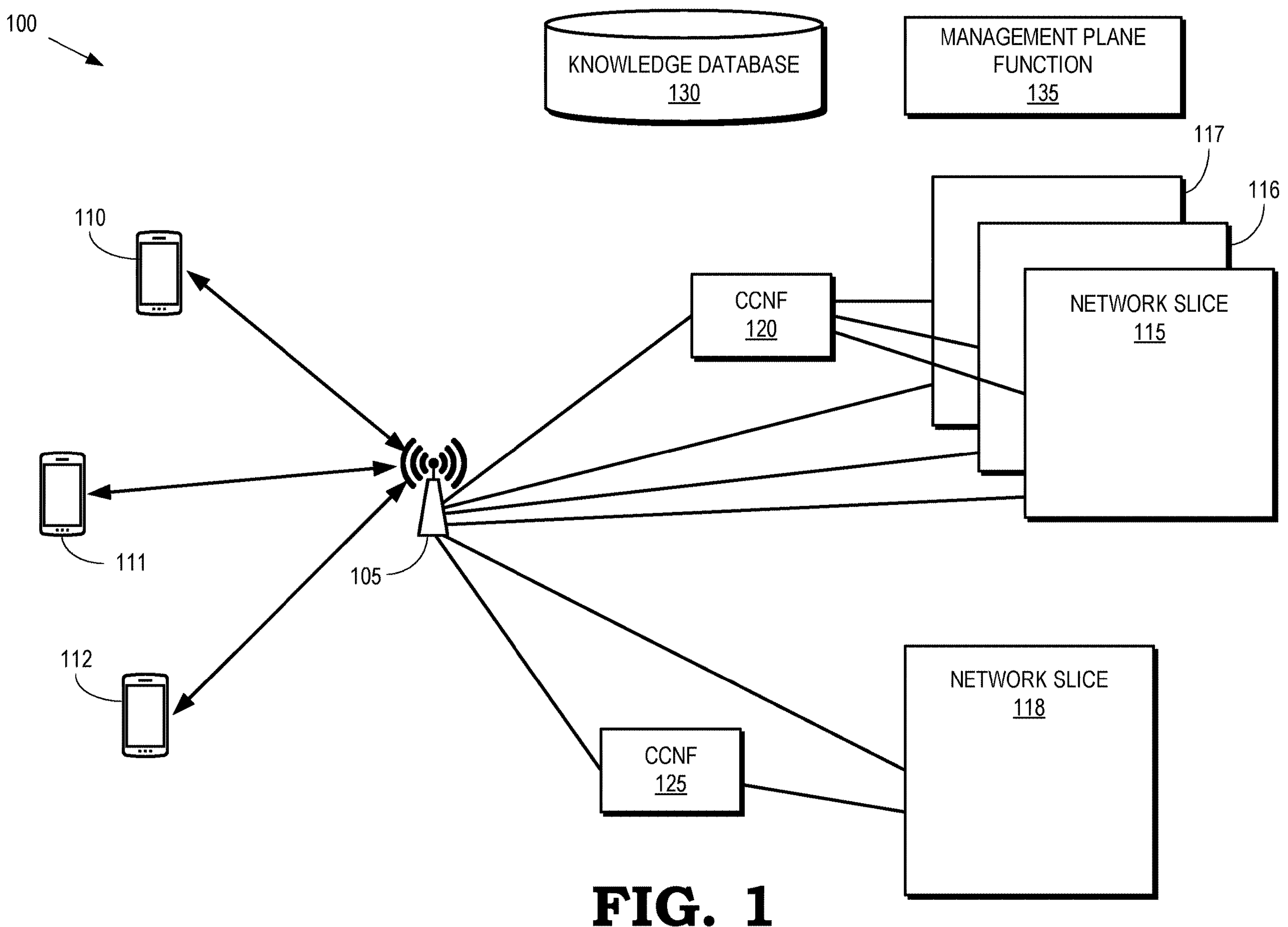
FIG. 1 is a block diagram of a wireless communication system that implements network function virtualization (NFV) according to some embodiments.

A network slice is a complete logical network that provides communication services and network capabilities, which can vary from slice to slice. User equipment are able to concurrently access multiple slices that support multiple service flows between a core network and the user equipment. The user equipment initially selects one or more slices to provide corresponding services and the user equipment can subsequently reselect to different slices. For example, the user equipment can transmit a slice reselection request in response to detecting degraded performance from a currently selected slice. The NFV infrastructure includes a slice selection function that is a control plane function configured to accept or reject selection or reselection requests that are received from the user equipment. The slice selection function determines whether to accept or reject the selection or reselection requests based on predetermined rules or based on results of previous requests, e.g., using a knowledge database that includes previous outcomes of slice selections or reselections in similar contexts.

Slice reselection requests are often triggered by an underlying issue or cause, which is referred to herein as a root cause although in some cases there may be other causes that underlay the cause that triggers the slice reselection requests. Examples of root causes that can trigger slice reselection requests by user equipment include problems with the computing, storage, or networking hardware resources in a cell that is serving the user equipment. Reselections can also be triggered by root causes including incompatibility between a model of user equipment and a currently selected slice, between an application running on the user equipment and the currently selected slice, or between the user subscription and the currently selected slice. As discussed herein, the slice selection function is a control function that is configured to quickly determine whether to accept or reject a selection or reselection request. The slice selection function is therefore not configured to gather information associated with requests over a relatively long time interval, nor is the slice selection function able to compare reasons for different slice selection or reselection requests to determine a root cause of the request. The inability to identify a root cause prevents the NFV infrastructure from correcting the root cause, which allows the root cause to persist and continue to trigger unnecessary slice reselection requests.

FIGS. 1-6 illustrate embodiments of an NFV architecture that include management plane functions that are configured to detect root causes of slice reselection requests by collecting information indicating reasons for slice reselection requests from user equipment, e.g., a user equipment can request slice reselection in response to throughput for an application falling below a threshold, which are stored in self-operation cases. A self-operation case is generated in response to a slice reselection request. Some embodiments of a self-operation case include information identifying an event that triggered the slice reselection request, a context in which the event occurred, an action that is taken in response to the event, and a result of the action, as well as identifiers of a group associated with the self-operation case and a profile. The management function identifies a root cause for slice reselection requests in response to a large number of self-operation cases (e.g., more than a threshold number) having the same reason, the same slice, or the same cell. The root cause is one of a predetermined set of issues or a combination of the issues. Examples of issues that cause slice reselection requests include issues with the model of the user equipment, applications running on the user equipment, a user subscription, a radio implemented by the user equipment, or a type of the current slice allocated to the user equipment. The root cause is identified by applying detection rules for the issues to the self-operation cases. Identifiers of detected issues are then associated with the self-operation cases.

Some embodiments of the management plane function generate a remedial action for the root cause based on a set of previously generated self-operation cases associated with the root cause. The previously generated self-operation cases are stored in a knowledge database and each previously generated self-operation case holds context information for a previous slice reselection request. The context information can include a network context that is represented by a slice identifier, a cell identifier, a cell technology, a cell type, a cell traffic pattern, and the reason for the reselection. The context information can also include a user equipment context that is represented by the user equipment identifier, a model of the user equipment, information identifying applications that are active on the user equipment, and the like. The management plane function compares the context associated with the root cause identified for the slice reselection requests to the set of previously generated self-operation cases, e.g., using a similarity measure based on an identifier of the root cause and the context. Based on the comparison, the management plane function selects a remedial action to address the root cause of the slice reselection requests and applies the remedial action. If the management function is unable to identify a remedial action using the previously generated self-operation cases, the remedial action can be determined based on one or more predefined rules or based on human intervention. The management plane function applies the remedial action and then determines whether the candidate solution improved performance for the user equipment. The result of applying the remedial action is added to the self-operation cases, which are then added to the knowledge database to assist in identifying root causes of subsequent slice reselection requests.

FIG. 1 is a block diagram of a wireless communication system 100 that implements network function virtualization (NFV) according to some embodiments. The wireless communication system 100 includes cells 105 (only one illustrated in FIG. 1 in the interest of clarity) that provide wireless connectivity to user equipment 110, 111, 112, which are collectively referred to herein as “the user equipment 110-112.” The cell 105 uses NFV to support one or more network slices 115, 116, 117, 118, which are collectively referred to herein as “the slices 115-118.” As discussed herein, each of the slices 115-118 is a complete logical network that provides communication services and network capabilities, which can vary from slice to slice. The slices 115-118 are allocated to provide services to the user equipment 110-112. In the illustrated embodiment, the slices 115-117 are allocated to the user equipment 110 to provide services to the user equipment 110. The network slice 118 is allocated to the user equipment 111 and used to provide services to the user equipment 111.

The cell 105 supports slice selection functions 120, 125 that are used to select the subsets of the slices 115-118 for allocation to one or more of the user equipment 110-112. In some embodiments, the slice selection functions 120, 125 are implemented as common control plane network functions (CCNF) 120, 125. The user equipment 110-112 transmit slice selection or reselection requests to request allocation of the slices 115-118. For example, the user equipment 110-112 transmit slice selection requests to the slice selection functions 120, 125 when the user equipment 110-112 initially attaches to the wireless communication system 100. The slice selection functions 120, 125 allocate one or more of the slices 115-118 to the user equipment 110-112 in response to receiving the initial slice selection requests.

The user equipment 110-112 transmit slice reselection requests to request reallocation of the slices 115-118. For example, the user equipment 110 can transmit a slice reselection request to the slice selection function 120 to request reallocation of the slice 117. In the interest of clarity, requests transmitted by the user equipment 110-112 for initial allocation of a slice are referred to herein as “slice selection requests” and requests transmitted by the user equipment 110-112 for reallocation of a previously allocated slice are referred to as “slice reselection requests.” However, in some embodiments, both types of requests can be referred to as slice selection requests.

Slice reselection requests include information indicating reasons for the request. A reason for a slice reselection request includes dissatisfaction with the service currently being provided by the allocated slice. In some embodiments, the reason is conveyed in a data element that includes information identifying a parameter that is unsatisfied and causes the user equipment 110-112 to request slice reselection, a measurement approach that is used to evaluate the unsatisfied parameter, and a limit value of the parameter that indicates when the parameter is considered to be satisfied. Examples of parameters include throughputs, bit error rates, signal-to-noise ratios, and the like. Examples of measurement approaches include average values of a parameter over a time interval, a standard deviation of the parameter during the time interval, a formula indicating a relationship between a set of parameters, a minimum value of samples of the parameter from among a set of samples, and the like. Examples of the satisfaction parameter include a threshold value above which the parameter is considered satisfied, a threshold value below which the parameter is considered satisfied, a range of values in which the parameter is considered satisfied, and the like. For example, the user equipment 110 can transmit the slice reselection request to request reallocation of the slice 117 in response to a throughput for a service or an application that is supported by the slice 117 falling below a threshold throughput, a bit rate falling below a corresponding threshold, and a latency increasing above a corresponding threshold, key performance or service quality indicators deteriorating, or in response to other sources of user dissatisfaction. The threshold or target values can be specified in user subscription data such as a Service Level Agreement (SLA). A data element that includes a reason for a slice reselection request can include more than one parameter-measure-limit combination to indicate that multiple parameters are considered unsatisfied. The user equipment 110 transmits the reason for the request is transmitted to the slice selection function 120, which responds by transmitting reasons for a decision to grant or deny the request back to the user equipment 110. Techniques for conveying reasons between the user equipment 110-120 and the slice selection functions 120, 125, as well as additional examples of reasons for reselection of a previously allocated slice, are provided in Serial No. PCT/FI2017/050362 (from disclosure NC102597), entitled Experience-based reselection of a network slice and filed on 10 May 2017, which is incorporated herein by reference in its entirety.

Slice selection and reselection requests are associated with contexts that describe a state of the wireless communication system 100 when the user equipment 110-112 transmit the slice selection or reselection request. Contexts include network contexts that characterize states of the network elements in the wireless communication system 100 and user equipment contexts that characterize the state of the user equipment 110-112 when the slice selection or reselection request is transmitted. Examples of network context parameters include identifiers of slices that are allocated to the user equipment 110-112 by the slice selection functions 120, 125 and an identifier of a cell (such as the cell 105) that supports the slice. The network context parameters can also include parameters that identify a technology implemented by the cell such as Long Term Evolution (LTE) or Wi-Fi and a type of the cell 105 such as a base station, the base station router, eNodeB, macrocell, microcell, picocell, femtocell, and the like. The network context parameters can also include parameters indicating a traffic pattern in the cell 105 such as a physical distribution of the user equipment 110-112, loading of the cell 105 is a function of time, and the like. The network parameters can also include the reason for a slice reselection request. In some embodiments, the user equipment contexts include an identifier of the user equipment 110-112, a model of the user equipment 110-112, information identifying applications that are active on the user equipment 110-112, and the like.

Slice reselection requests trigger generation of self-operation cases that are stored in a knowledge database 130. In the interest of clarity, the specific connections between the knowledge database 130 and other elements in the wireless communication system 100 are not shown in FIG. 1. However, information stored in the knowledge database 130, such as the self-operation cases for the slice reselection requests, is accessible to other elements in the wireless communication system 100 including the slice selection functions 120, 125. Self-operation cases are learned or constructed based on operations performed by entities in the wireless communication system 100. In some embodiments, the self-operation cases include fields for storing information identifying a reason for the slice reselection request, an event that triggered the slice reselection request, a context in which the event occurred, an action that is taken in response to the event, and a result of the action, as well as identifiers of a group associated with the self-operation case and a profile. The fields of a self-operation case are not all necessarily filled with a value at the same time. For example, a self-operation case can be generated with values of the reason, the triggering event, and the context in response to receiving the slice reselection request. Other fields of the self-operation case are filled in with a value at a later time, e.g., values indicating the action that is taken, and the result of the action are entered after the action has been taken and performance of the network has been monitored to determine the result. Self-operation in an NFV system is disclosed in Serial No. PCT/EP2015/061927 (from disclosure 2015E00394FI), entitled METHOD AND APPARATUS FOR IMPLEMENTING SELF-OPERATION FUNCTIONS WITHIN A NETWORK and filed on 29 May 2015, which is incorporated herein by reference in its entirety.

The slice selection functions 120, 125 are able to approve or reject slice reselection requests based on the reason for the request and the associated context. In some embodiments, the slice selection functions 120, 125 decide whether to approve or reject the slice reselection request based on previously acquired self-operation cases that have similar contexts to the current slice reselection request. For example, if a set of historical self-operation cases have similar contexts to the current slice reselection request, and approving the previous slice reselection requests improved performance, the slice selection functions 120, 125 approve the current slice reselection request. Otherwise, the slice reselection request is rejected. Similarity measures that are used to identify matching self-operation cases are disclosed in Serial No. PCT/EP2016/053511 (from disclosure 2015E01778FI), entitled Definition and application of similarity measures and filed on Feb. 19, 2016, which is incorporated herein by reference in its entirety. Techniques for re-selecting network slices based on matching self-operation cases are disclosed in Serial No. PCT/FI2017/050362 (from disclosure 102597), entitled Experience-based reselection of a network slice and filed on May 10, 2017, which is incorporated herein by reference in its entirety.

If the slice selection functions 120, 125 approve a slice reselection request, the context in the corresponding self-operation case is modified to reflect approval of the request. The self-operation case is also modified to include information indicating whether reselection of a slice in response to the slice reselection request was a success or failure, e.g., whether the throughput to the user equipment 110-112 increased, decreased, or stayed the same during a predetermined time interval following the reselection to a different slice.

A management plane function 135 is configured to analyze slice reselection requests based on the self-operation cases stored in the knowledge database 130. In the interest of clarity, the specific connections between the management plane function 135 and other elements in the wireless communication system 100 are not shown in FIG. 1. However, the management plane function 135 is able to exchange information with other elements in the wireless communication system 100 including the slice selection functions 120, 125. The management plane function 135 operates on a time scale that is relatively long compared to the time scale used by the slice selection functions 120, 125. Some embodiments of the management plane function 135 analyze groups of self-operation cases that are gathered over timescales on the order of minutes, whereas the slice selection functions 120, 125 operate on timescales on the order of milliseconds. The management plane function 135 is therefore able to identify issues that are not visible to the slice selection functions 120, 125. For example, in some cases, the slice selection functions 120, 125 make an incorrect decision on a slice reselection request and the management plane function 135 can identify the incorrect decisions by analyzing the self-operation cases over a longer timescale. Moreover, slice reselection requests can become obsolete due to changes in the slice related contexts such as changes in network status, user device status, or user subscriptions. The management plane function 135 can identify obsolete self-operation cases to reduce the likelihood that the slice selection functions 120, 125 will make an incorrect decision by using obsolete information. Techniques for evaluating self-operation cases are disclosed in Serial No. PCT/EP2017/071256 (from disclosure 102724), entitled Automatic evaluation and management of slice reselection experiences and filed on Aug. 23, 2017, which is incorporated herein by reference in its entirety.

The management plane function 135 is configured to identify root causes for slice reselection requests in response to the wireless communication system 100 receiving a large number of self-operation cases having the same reason, the same slice, or the same cell. For example, if the cell 105 receives a number of slice reselection requests that exceeds a threshold number, the management plane function 135 analyzes the self-operation cases associated with the slice reselection requests to determine the root cause. For another example, the management plane function 135 analyzes the self-operation cases associated with the slice 115 if the cell 105 receives a number of slice reselection requests from the user equipment 110-112 that are receiving services provided by the slice 115. In some embodiments, the root cause is one of a predetermined set of issues or a combination of the issues. Examples of issues that cause slice reselection requests include issues with the model of the user equipment, applications running on the user equipment, a user subscription, a radio implemented by the user equipment, or a type of the current slice allocated to the user equipment.

The management plane function 135 identifies the root cause by applying detection rules for the issues to the self-operation cases. Some embodiments of the management plane function 135 generate identifiers of the detected issues and incorporate these into the self-operation cases that are stored in the knowledge database 130 so that this information can be used to identify subsequent issues in the cell 105 (or other cells).

Some embodiments of the management plane function 135 generate a remedial action for the root cause based on a set of previously generated self-operation cases that are stored in the knowledge database 130. The previously generated self-operation cases are filtered on the basis of the root causes of the current and previous self-operation cases. Each previously generated self-operation case holds the reason for a previous slice reselection request and context information for the previous slice reselection request. The management plane function 135 compares the context associated with the root cause identified for the slice reselection requests to the set of previously generated self-operation cases, e.g., using a similarity measure based on an identifier of the root cause and the context. Based on the comparison, the management plane function 135 selects a remedial action to address the root cause of the slice reselection requests and applies the remedial action in the wireless communication system 100. If the management function 135 is unable to identify a remedial action using the previously generated self-operation cases, the remedial action is determined based on predefined rules or the decision can be escalated to a human engineer who determines a remedial action that can be taken. The remedial action is then used to modify a configuration of the wireless communication system 100.

Once the wireless communication system 100 has been modified based on the remedial action, the management plane function 135 monitors parameters associated with the user equipment 110-112 that requested the reselection to determine whether the remedial action improved performance. The management plane function 135 can modify the self-operation cases by incorporating an indication of the remedial action and whether the remedial action improved performance. The modified self-operation cases are stored in the knowledge database 130 to assist in identifying root causes of subsequent slice reselection requests.

Figure 2:
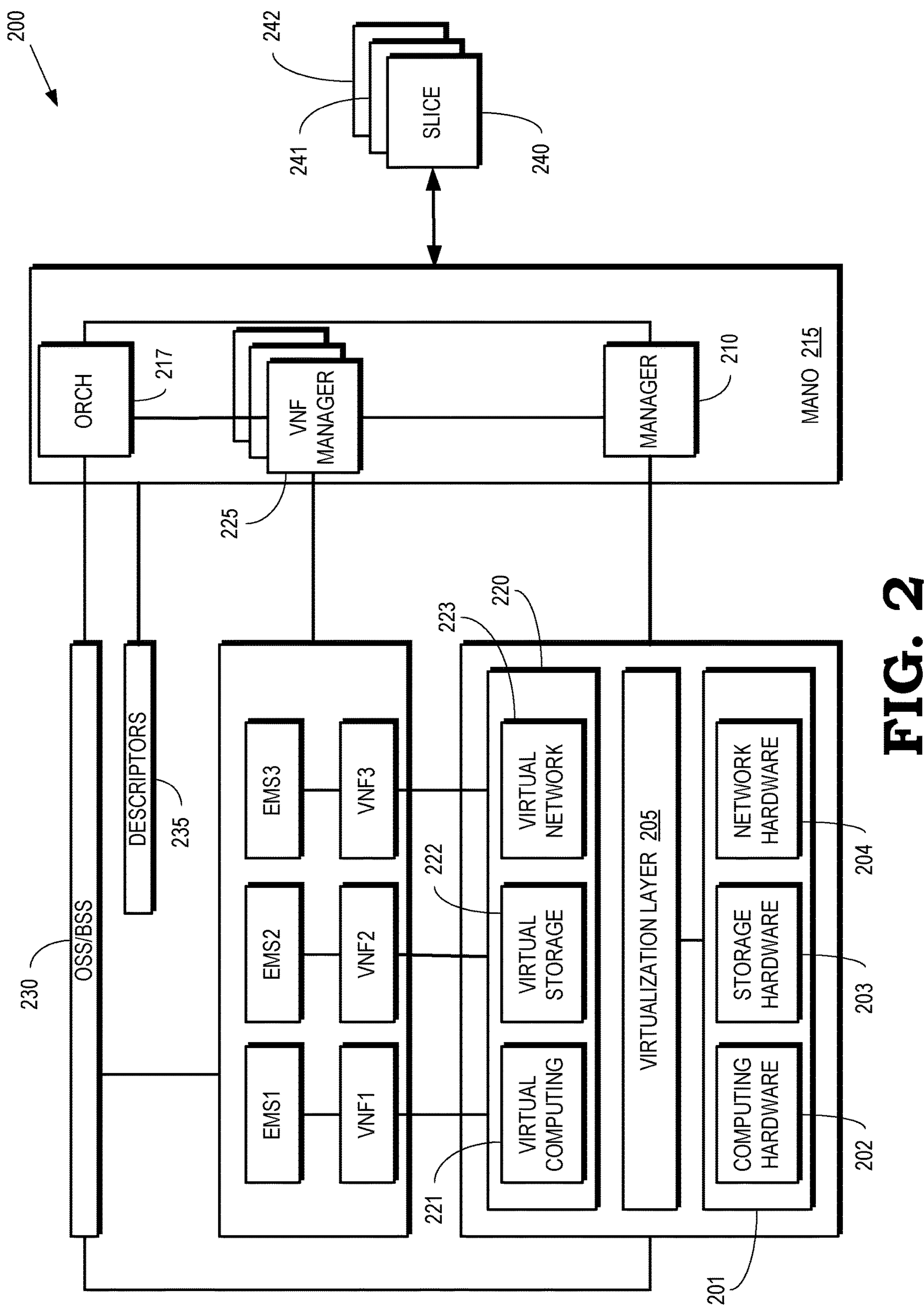
FIG. 2 is a block diagram of an NFV architecture according to some embodiments.

FIG. 2 is a block diagram of an NFV architecture 200 according to some embodiments. The NFV architecture 200 is used to implement some embodiments of the wireless communication system 100 shown in FIG. 1. For example, instances of the network slices 115-118, slice selection functions 120, 125, and management plane function 135 can be instantiated as virtual functions in the NFV architecture 200. The NFV architecture 200 includes hardware resources 201 including computing hardware 202, storage hardware 203, and network hardware 204. The computing hardware 202 is implemented using one or more processors, the storage hardware 203 is implemented using one or more memories, and the network hardware 204 is implemented using one or more transceivers, transmitters, receivers, interfaces, and the like.

A virtualization layer 205 provides an abstract representation of the hardware resources 201. The abstract representation supported by the virtualization layer 205 can be managed using a virtualized infrastructure manager 210, which is part of the NFV management and network orchestration (MANO) module 215. Some embodiments of the manager 210 are configured to collect and forward performance measurements and events that may occur in the NFV architecture 200. For example, performance measurements may be forwarded to an orchestrator (ORCH) 217 implemented in the MANO 215. The hardware resources 201 and the virtualization layer 205 may be used to implement virtual resources 220 including virtual computing resources 221, virtual storage resources 222, and virtual networking resources 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the MANO 215.

The NFV architecture 200 implements network slices 240, 241, 242 that provide control plane functions or user plane functions. As discussed herein, each of the network slices 240, 241, 242 is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
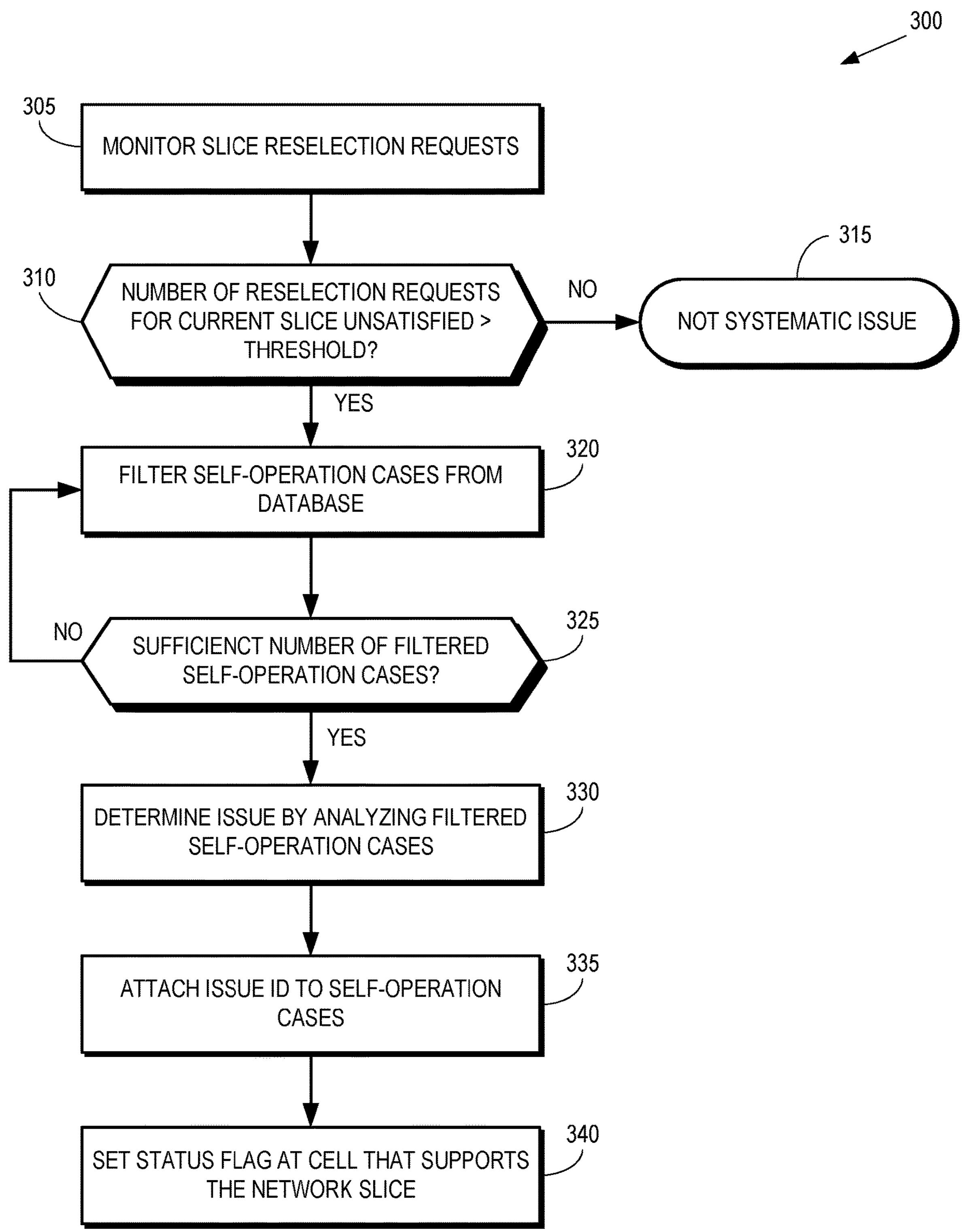
FIG. 3 is a flow diagram of a method of identifying issues associated with a root cause of slice reselection requests according to some embodiments.

FIG. 3 is a flow diagram of a method 300 of identifying issues associated with a root cause of slice reselection requests according to some embodiments. The method 300 is implemented in some embodiments of the wireless communication system 100 shown in FIG. 1. For example, the method 300 can be implemented in the management plane function 135 shown in FIG. 1. In the illustrated embodiment, the method 300 is applied to detect root causes of slice reselection requests received by a cell for a slice supported by the cell. However, in some cases, multiple instances of the method 300 are performed separately, simultaneously, concurrently, or in parallel to detect issues for combinations of cells or slices.

At block 305, the management plane function monitors slice reselection requests received from user equipment in the wireless communication system. Monitoring the requests includes monitoring a number of user equipment that are reporting the same unsatisfied factor (e.g., an application throughput below a threshold) for the cell and the slice that is supported by the cell. Monitoring the request also includes monitoring a total number of slice reselection requests received by the cell. The monitoring is performed during the predetermined granularity time interval such as a predetermined number of minutes. Self-operation cases are generated for the slice reselection requests that are collected during the granularity time interval. The slice reselection requests are associated with reasons for the request. The reasons come in different types. In some embodiments, the reason types include "initial slice selection" for an initial slice selection request, "current slice about to get out of reach" if the user equipment is moving away from the cell providing the slice, "current slice unsatisfied" if the user equipment determines that one or more parameters are unsatisfied, "better slice detected" if the user equipment identifies a preferable slice, "insufficient user equipment capability" if the network determines that the user equipment is not able to connect with the slice, "not allowed by network policy" if the network determines that the user equipment is not permitted to access the slice, "no more suitable slice available" if the network determines that all available slices are fully allocated, and "addressed in current slice" if the network rejects a slice reselection requests but attempts to meet the requirements of the user equipment through network reconfiguration such as slice scaling-out or traffic management of the current slice.

At decision block 310, the management plane function determines a number of slice reselection requests of the type "current slice unsatisfied" that are received during a granularity time interval. The management plane function then determines whether the number exceeds a threshold. In some embodiments, the number of slice reselection requests associated with a same reason, a same slice, or a same cell supporting the slice are compared to a corresponding threshold number at decision block 310. The management plane function is also able to determine whether a deviation in the number of slice reselection requests from a baseline or average number of slice reselection requests is higher than a predetermined tolerance level. The threshold comparison or the tolerance comparison are performed separately or in combination to determine whether the slice reselection requests are occurring frequently enough to indicate a systematic issue that should be addressed by the wireless communication system. If the number does not exceed the threshold (or the deviation does not exceed the tolerance level), there is no systematic issue occurring and the method 300 ends at block 315. The method 300 flows to block 320 if the number exceeds the threshold or the deviation exceeds the tolerance level.

At block 320 the management plane function retrieves and filters self-operation cases stored in a database such as the knowledge database 130 shown in FIG. 1, which can be implemented in a central self-operation entity. In some embodiments, the self-operation cases are filtered on the basis of a similarity measure that identifies self-operation cases that are sufficiently similar to each other and are considered to "match" each other. The similarity measure is then used to extract information from the matching self-operation cases that are stored in the knowledge database. For example, the filtering can be done by using the following similarity measure:

```
Similarity measure = {
   context::ReasonTypeID= "current slice unsatisfied",
   context::CurrentSliceType= slice type of the slice currently used by the
requesting UE,
   1..n(Parameter, Measure, Limit),
   result::rejection::ReasonTypeID ≠ "insufficient UE capability"}
```

Note, "x::y" means "the y of x."

The above similarity measure filters the self-operation cases separately for each group on the basis of identifiers such as a slice identifier, types such as a slice type, and the reason for the slice reselection request, which can be indicated using a reason type identifier. The matching self-operation cases identified using the similarity measure therefore form a group of self-operation cases that share a reason for a slice reselection request. A result of the slice reselection requests for the self-operation cases in the group identified by the similarity measure was rejection of the slice reselection request, e.g., for a reason other than insufficient user equipment capability. In some cases, there is more than one reason for a slice reselection request and one group of matching self-operation cases is therefore identified for each reason for a slice reselection request.

At decision block 325, the management plane function determines whether a sufficient number of self-operation cases are collected in the filtered group produced in block 320. If not, the method 300 flows back to block 320 and continues to collect additional self-operation cases. If there is a sufficient number of self-operation cases in the filtered group, the method 300 flows to block 330.

At block 330, the management plane function analyzes the filtered self-operation cases to determine one or more issues associated with the performance of the slice with respect to slice reselection requests. In some embodiments, the management plane function analyzes matching self-operation cases with regard to their context such as a cell identifier, one or more attributes, parameters, measurements, limits, user equipment identifiers, user equipment model, and application running on the user equipment. The management plane function also identifies the issues causing the slice reselection requests based on detection rules associated with the corresponding issues. In some embodiments, the issues and the corresponding detection rules are selected from a set of issues/detection rules such as the set shown in Table 1.

TABLE 1

| Issue Causing Slice Reselection | Definition and attributes | Remarks |
|---|---|---|
| Issue ID | A unique sequence number that identifies a specific issue defined below. | |

TABLE 1-continued

| Issue Causing Slice Re-selection | Definition and attributes | Remarks |
|---|---|---|
| issueAtUEmode | This means UE mode may be the actual cause for the dissatisfaction and thus the reason for slice reselection request. Attributes are IssueID, UE Model, and the matching self-operation cases. Detection rule: Most or all the matching self-operation cases have the same UE model, where the matching operation cases also match the latest problem filter (if any) provided by a network management function. | This issue may imply that the UE mode may need to be assigned to another more suitable slice. IssueID is a unique ID of this issue. SM-ID is SM1. |
| issueAtApplication | This means the UE application may be the actual cause for the dissatisfaction and thus the reason for slice reselection request. Attributes are IssueID, service type and QoS setting of the application, UE Model, and the matching self-operation cases. Detection rule: Most or all the matching self-operation cases have the same UE application. | This issue may imply that the application needs to be assigned to another more suitable slice or the current slice is scaled out accordingly. IssueID is a unique of this issue. SM-ID is SM1. |
| issueAtUserSubscription | This means the subscription for the users may be the actual cause for the dissatisfaction and thus the reason for slice reselection request. Attributes are IssueID, Subscription ID, UE IDs, and the matching self-operation cases, where the Subscription ID is extracted (by using the UE ID attributes) from the user subscription data (e.g., at PCF—Policy Control Function). Detection rule: Most or all the matching self-operation cases have the same user subscription associating with their UE ID attributes of their context elements. | This issue may imply that the subscription needs to be reviewed and updated together with the users. IssueID is a unique ID of this issue. SM-ID is SM1. Updates are taken into account and self-operation cases are managed in a way that up-to-date experience is always applicable for further analysis. |
| issueAtRadio | This means the radio may be the actual cause for the dissatisfaction and thus the reason for slice reselection request. Attributes are IssueID, their common radio context elements defined in the context element of Table 3 of [6], and the matching self-operation cases. Detection rule: Most or all the matching self-operation cases have the same attributes of radio context. | This issue may imply that corresponding radio slice may need to be scaled out or re-assigned accordingly. IssueID is a unique ID of this issue. SM-ID is SM1. |
| issueAtSliceType | This means that the slice type may be the actual cause for the dissatisfaction and thus the reason for slice reselection request. The hidden cause can be such as the slice is not properly defined and composed. Attributes are IssueID, Current Slice Type and optionally Current Slice ID, and the matching self-operation cases. Detection rule: Most or all the matching self-operation cases have same current slice type, optionally same current slice ID, and that all other context attributes are different. | This issue may imply that corresponding slice type may need to be re-defined and composed. IssueID is a unique ID of this issue. SM-ID is SM1. |

For example, if a statistically significant number of the filtered self-operation cases have the same model number, the management plane function determines that there is an issue with the user equipment model. In some cases, the management plane function recommends that the user equipment be moved to a different slice.

At block 335, the management plane function modifies the filtered self-operation cases to include one or more identifiers of one or more issues that are identified using the detection rules in block 330.

At block 340, the management plane function sets a status flag at the cell that supports the network slice based on the detected issues. The status flag is used to change the status of the cell or the slice to indicate an ongoing issue in the slice. The value of the status flag is used to configure operation of the cell or slice. For example, if the status flag is set to ON to indicate an ongoing issue with the cell or slice, the value of the status flag can be incorporated into the self-operation cases that are created and utilized as long as the issue remains ongoing in the slice. For another example, rule-based selection can be used to remove the current cell or slice as a candidate for slice reselection from other cells or slices while the status flag is set to ON. If the issue is related to a particular user equipment identifier, application identifier, or subscription identifier, then other users having one or matching identifiers are not able to perform slice reselection to the cell or slice. If the issue is specifically related to a particular radio access network or network slice, reselection to the radio access network or network slice can be banned for all types of users. The status flag is reset, e.g. set to a value of OFF, once the issue has been resolved, as discussed below. The status flag is therefore set concurrently with the detected issues.

The one or more issues identified by the method 300 represent a root cause of the slice reselection requests that are represented by the current self-operation cases. Once the root cause has been identified, e.g., once the one or more issues have been detected, a remedial action is performed to attempt to resolve the root cause by reconfiguring the wireless communication system.

Figure 4:
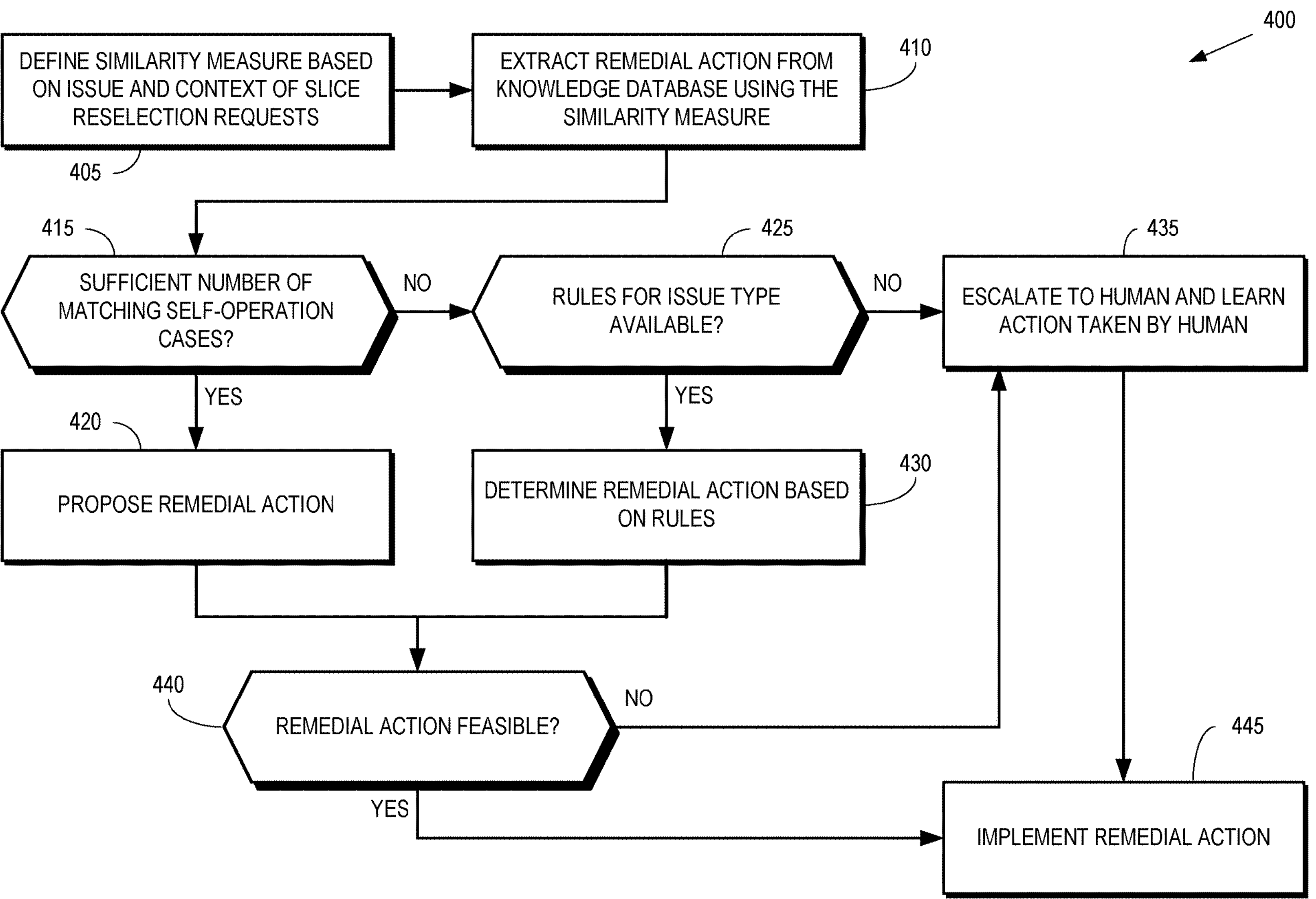
FIG. 4 is a flow diagram of a method for identifying and performing a remedial action to address one or more issues causing slice reselection requests according to some embodiments.

FIG. 4 is a flow diagram of a method 400 for identifying and performing a remedial action to address one or more issues causing slice reselection requests according to some embodiments. The method 400 is initiated in response to identifying issues or a root cause of slice reselection requests represented by current self-operation cases, e.g., using some embodiments of the method 300 shown in FIG. 3. The method 400 is implemented in some embodiments of the wireless communication system 100 shown in FIG. 1. For example, the method 400 can be implemented in the management plane function 135 shown in FIG. 1. As discussed above, in some cases the root cause includes more than one issue, in which case the method 400 is performed multiple times to identify remedial actions for the different issues associated with the root cause. Multiple instances of the method 400 are performed separately, concurrently, or in parallel.

At block 405, the management plane function defines a similarity measure based on the issue associated with the root cause (which can be indicated by an issue identifier) and a context for the slice reselection request. The issue and the context are included in the current self-operation cases, as discussed herein. In some embodiments, the context used to define the similarity measure includes one or more of a slice identifier, a slice type, a cell identifier, a set of cell attributes, identifiers of the user equipment that issue the slice reselection requests, model of the user equipment, an application implemented in the user equipment, and one or more parameters that reflect the cause of the dissatisfaction that triggered the slice reselection request. Examples of the parameters include parameters indicating that a bandwidth or a bit rate is lower than expected or below a threshold, parameters indicating that a packet delay exceeds a corresponding threshold, and parameters indicating key performance indicators, key quality indicators, quality of service, quality of experience, or other metrics.

At block 410, the management plane function extracts or identifies a remedial action from a knowledge database (such as the knowledge database 130 shown in FIG. 1) using the similarity measure. The similarity measure is used to match the issue and context in the current self-operation cases to previous self-operation cases in the knowledge database. The matching previous self-operation cases include information indicating remedial actions that were taken to attempt to resolve the issues associated with the previous self-operation cases and information indicating whether the remedial actions successfully improved performance. Based on this information, the management plane function attempts to identify a remedial action that is expected to successfully improve performance when the wireless communication system is reconfigured in accordance with the remedial action.

At decision block 415, the management plane function determines whether a sufficient number of matching previous self-operation cases have been identified to provide a solution with a high degree of confidence. If so, the method 400 flows to block 420. If not, the method 400 flows to decision block 425.

At block 420, the management plane function proposes a remedial action for reconfiguring the wireless communication system. Examples of remedial actions that can be proposed include assignment of an application to another slice, traffic steering such as a load based handover to another cell or quality of service differentiation, or an update of an application version, a user subscription, or firmware or software implemented in the user equipment. Other examples of remedial actions include out-scaling of slice resources and re-assignment of radio or slice related attributes or characteristics. The remedial action can also include actions to address issues that have degraded radio performance or conditions such as sleeping cells, coverage holes, or high interference.

At block 425, the management plane function determines whether there are predetermined rules available to determine remedial actions to address the issues. For example, predetermined rules can map particular combinations of issues and contexts to specific remedial actions such as the examples of remedial actions discussed above. If the management plane function identifies a predetermined rule that is applicable to the current issue and context, the method 400 flows to block 430. If the management plane function is unable to identify an applicable rule, the method 400 flows to block 435.

At block 430, the management plane function determines a remedial action based on a predetermined rule that maps the current issue and context to a remedial action.

At block 435, the management plane function escalates the issue to allow human intervention to address the issue, e.g., by proposing a solution. In some embodiments, a remedial action is identified and implemented in response to the human intervention. In that case, the action and then the results of the action are learned by the management function, e.g., by storing information indicating the action and the results in the current self-operation cases, as discussed below. The method 400 then flows to block 445 and the proposed solution is implemented.

At decision block 440, the management plane function determines whether the proposed remedial action is feasible. As discussed above, the remedial action can be proposed based on matching self-operation cases (as in block 420) or based on a predetermined rule (as in block 430). Some embodiments of the feasibility check include querying a data center management function to request information that indicates the resources that are available in the wireless communication system. The resource information is then used to assess whether scaling out of the resources to implement the proposed remedial action is possible. Some embodiments of the feasibility check include queries to determine whether software updates, more recent versions of an application, or other information are available to implement a proposed remedial action. If the proposed remedial action is not feasible, the method 400 flows to block 435 to escalate the issue for human intervention. If the proposed remedial action is feasible, the method 400 flows to block 445.

At block 445, the management plane function implements the remedial action. Some embodiments of the management plane function implement the remedial action by generating signaling that is transmitted to the user equipment that generated the slice reselection requests, a serving cell such as the cell 105 shown in FIG. 1, a slice selection function such as the slice selection function is 120, 125 shown in FIG. 1, or other elements of an NFV system. In response to receiving the signaling, the element of the NFV system is reconfigured in accordance with the proposed remedial action. The signaling can include instructions to assign an application to another slice, instructions to perform traffic steering such as a load based handover to another cell or quality of service differentiation, or instructions to update an application version, a user subscription, or firmware or software implemented in the user equipment. The signaling can also include instructions to perform out-scaling of slice resources or re-assignment of radio or slice related attributes or characteristics. The signaling could also be used to initiate actions to address issues that have degraded radio performance or conditions such as sleeping cells, coverage holes, or high interference.

Figure 5:
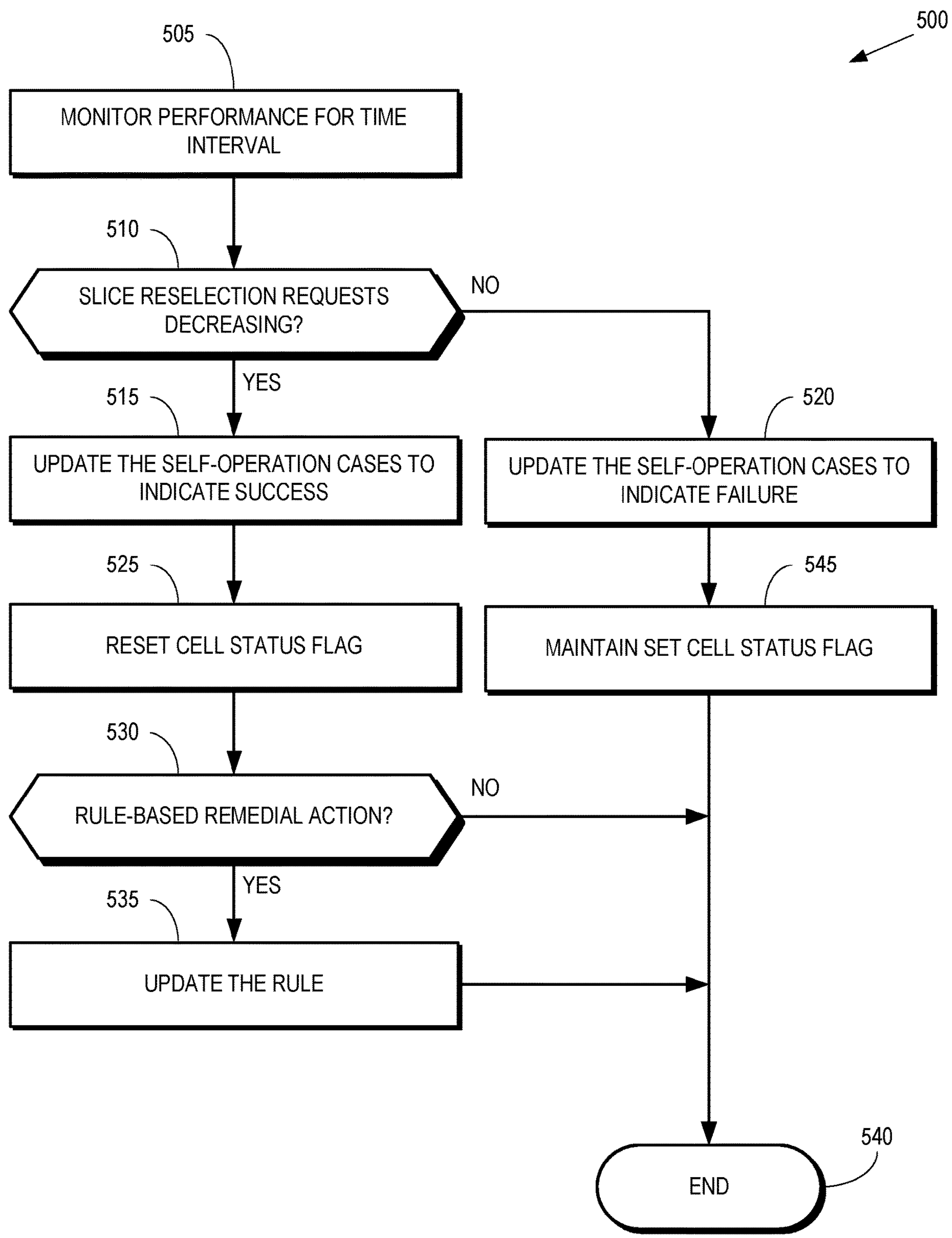
FIG. 5 is a flow diagram of a method of determining whether a remedial action successfully addressed one or more issues causing slice reselection requests according to some embodiments.

FIG. 5 is a flow diagram of a method 500 of determining whether a remedial action successfully addressed one or more issues that cause slice reselection requests according to some embodiments. The method 500 is initiated in response to performing a remedial action to attempt to address a root cause of slice reselection requests represented by current self-operation cases, e.g., using some embodiments of the method 400 shown in FIG. 4. The method 500 is implemented in some embodiments of the wireless communication system 100 shown in FIG. 1. For example, the method 500 can be implemented in the management plane function 135 shown in FIG. 1. As discussed above, in some cases the root cause includes more than one issue that is addressed by performing more than one remedial action, in which case the method 500 is performed multiple times to verify the effectiveness of the different remedial actions. Multiple instances of the method 500 are performed separately, concurrently, or in parallel.

At block 505, the management plane function monitors performance of the wireless communication system for a predetermined time interval. Some embodiments of the predetermined time interval have a duration that is on the order of minutes or hours. Monitoring the performance includes counting a number of slice reselection requests in the cell that is associated with the root cause that the management plane function attempted to address by performing one or more remedial actions. In some embodiments, the management plane function counts particular subsets of the slice reselection requests that correspond to the issue associated with the root cause. For example, the management plane function can count slice reselection requests that have the same reason (as indicated by a reason type identifier) as the reason in the current self-operation cases for the slice reselection requests associated with the root cause. The management plane function is also able to monitor the load level of the cell and other performance indicators.

At decision block 510, the management plane function determines whether performance of the wireless communication system improved during the predetermined time interval. In some embodiments, the management plane function compares a value of the counter that indicates the number of slice reselection requests during the predetermined time interval to a value of the counter during a previous time interval (or a corresponding threshold). For example, the management plane function can count a number of slice reselection requests with the reason "current slice unsatisfied" during the predetermined time interval and compare this number to a previously determined number of slice reselection requests with the reason "current slice unsatisfied." The management plane function is also able to monitor the load levels of the cells that are reporting an unsatisfactory experience during the predetermined time interval. Improvement in the performance is indicated by a decreasing number of slice reselection requests during the predetermined time interval relative to the previous time interval. Improvement in the performance is also indicated by a decrease in the load level, e.g., due to remedial actions such as scaling out decisions executed by resource management functions. If performance of the wireless communication system improved, the method 500 flows to block 515. If performance of the wireless communication system did not improve, the method 500 flows to block 520.

At block 515, the management plane function updates the current self-operation cases to indicate the remedial action that was performed and to indicate that the remedial action successfully improved performance of the wireless communication system. The added self-operation cases are stored in the knowledge database so that they can be used to identify potentially successful remedial actions for subsequent slice reselection requests that match the issue and context of the current self-operation cases.

At block 525, status flags associated with the cell or slice are updated in response to determining that the remedial action successfully resolved the root cause. For example, a status flag for a cell can be reset from ON to OFF. The method 500 then flows to decision block 530.

At decision block 530, the management plane function determines whether the remedial action was selected using a predetermined rule, as discussed above. If so, the method 500 flows to block 535 and the predetermined rules can be updated (if necessary) to indicate that the proposed remedial action successfully resolved the root cause. The method 500 then flows to termination block 540 and the method 500 ends. If the remedial action was not selected using a predetermined rule, the method 500 flows directly from decision block 530 to termination block 540 and the method 500 ends.

At block 520, the management plane function updates the current self-operation cases to indicate the remedial action that was performed and to indicate that the remedial action did not successfully improve performance of the wireless communication system. The added self-operation cases are stored in the knowledge database so that they can be used to identify remedial actions that are not likely to successfully resolve root causes for subsequent slice reselection requests that match the issue and context of the current self-operation cases. In some embodiments, the management plane function rolls back the remedial action to reconfigure the wireless communication system into its state prior to performing the remedial action. The method 500 then flows to block 545.

At block 545, status flags associated with the cell or slice are maintained in response to determining that the remedial action did not successfully resolve the root cause. For example, a status flag for a cell can be maintained at an ON value. In some embodiments, the management plane function escalates the issue to human intervention to attempt to find a better remedial action to address the root cause. The method 500 then flows to termination block 540 and the method 500 ends.

Figure 6:
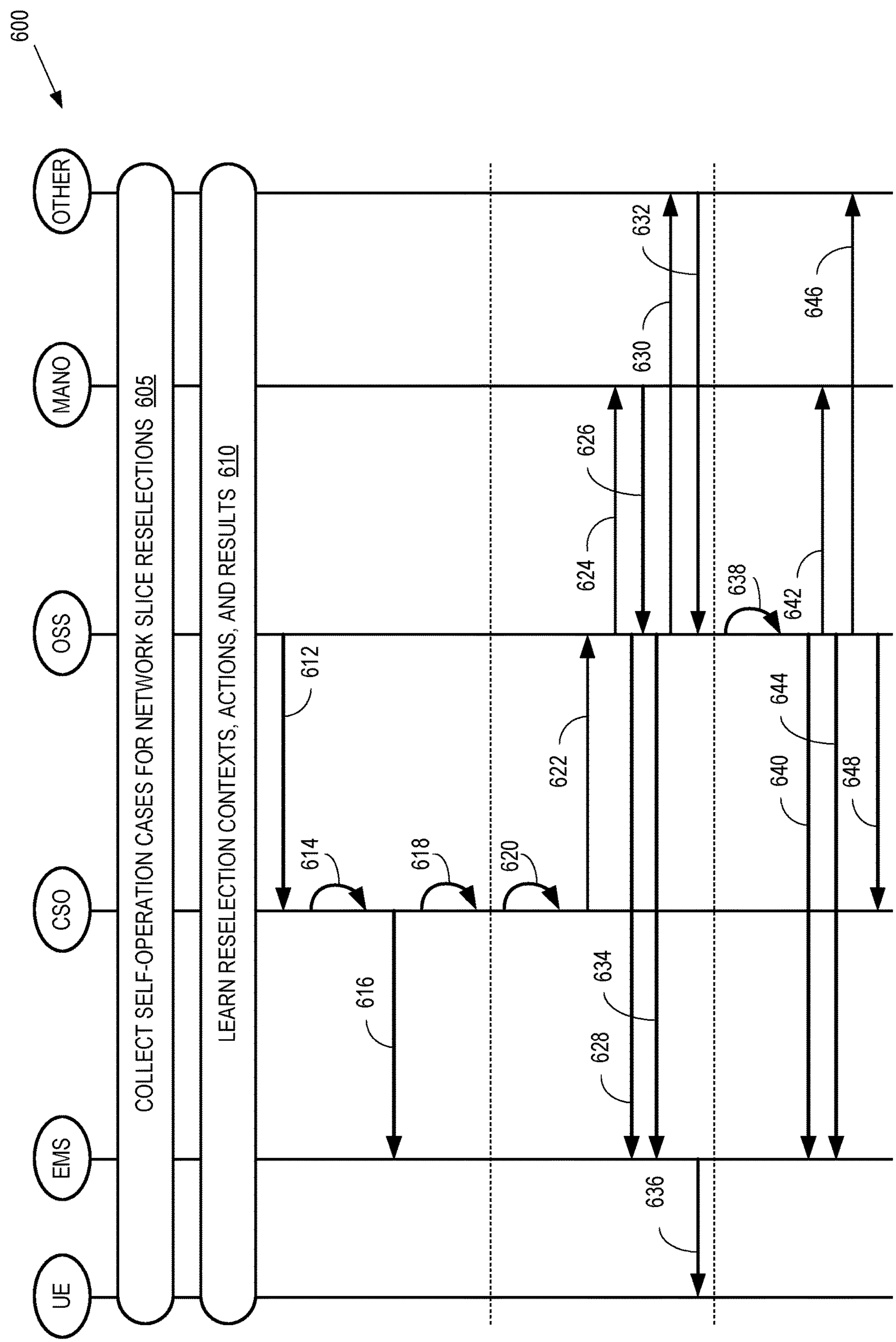
FIG. 6 is a message diagram that illustrates the identification, remedial actions, and verification of the remedial actions taken to address one or more issues causing slice reselection requests according to some embodiments.

FIG. 6 is a message diagram 600 that illustrates the identification, remedial actions, and verification of the remedial actions taken to address slice reselection requests according to some embodiments. The message diagram 600 is implemented in some embodiments of the wireless communication system 100 shown in FIG. 1. The message diagram 600 illustrates messages exchanged between a user equipment (UE), an element management system (EMS) that includes a slice selection function such as a CCNF, a central self-operation (CSO) system, an operation support system (OSS), a maintenance and network orchestration (MANO) system, and other control functions including subscription device management, access and admission control, quality of service operator control, and the like.

Self-operation cases for network slice reselection requests are collected using messages 605. Techniques for collecting self-operation cases are disclosed in Serial No. PCT/FI2017/050362 (from disclosure 102597), entitled Experience-based reselection of a network slice and filed on May 10, 2017, which is incorporated herein by reference in its entirety.

Reselection contexts, actions, and results are learned for a previous set of self-operation cases using messages 610. Newly learned slice reselection experiences and the management of slice reselection experiences following relevant changes in status, e.g., a network status change or user status change, are evaluated in some cases. Techniques for evaluating self-operation cases are disclosed in Serial No. PCT/EP2017/071256 (from disclosure 102724), entitled Automatic evaluation and management of slice reselection experiences and filed on Aug. 23, 2017, which is incorporated herein by reference in its entirety.

Following the messages 605, 610, a set of previous self-operation cases including issue identifiers, contexts, remedial actions, and results of the remedial actions are stored in a knowledge database such as the knowledge database 130 shown in FIG. 1. Self-operation cases are created continuously in response to every request from the user equipment for a slice reselection. The self-operation cases include reasons for the slice reselection requests, as discussed herein. Network performance with respect to the slice reselection requests is also monitored. In some embodiments, network performance is monitored by counting a number of user equipment that request slice reselections due to different reasons or counting a total number of slice reselections in a cell that supports a current slice that is serving the user equipment that requests the slice reselection.

Analysis of the self-operation cases is triggered by the OSS transmitting the message 612 to the CSO system. The CSO system then performs filtering 614 of the self-operation cases that have been collected in response to slice reselection requests with respect to different reasons for the corresponding slice reselection requests. The CSO system also analyzes the matching self-operation cases per reason to identify one or more issues associated with a root cause of the that specific reason. In some embodiments, the CSO system transmits a message 616 to the EMS system including instructions to set a status flag to indicate that issues exist with the cell or slice associated with a root cause that is identified by analyzing the matching self-operation cases for a particular reason. An identifier of the one or more issues that is identified by analyzing the matching self-operation cases is then attached (operation 618) to those analyzed self-operation cases. In some embodiments, if a previously identified issue has not been resolved or removed and the corresponding slice has not been excluded from subsequent reselections, the identifier is also attached to self-operation cases that are subsequently generated and match the self-operation cases that were used to identify the one or more issues associated with the issue identifier. Some embodiments of the messages and operations 612, 614, 616, 618 are performed according to the method 300 shown in FIG. 3.

A knowledge database such as the knowledge database 130 shown in FIG. 1 is then searched for a possible solution using the issue identifiers and corresponding contexts from the matching self-operation cases. In the illustrated embodiment, a similarity measure is defined (operation 620) for the issue and context and used to search the knowledge database for matching self-operation cases. If a sufficient number of matching self-operation cases are found, a solution or remedial action is extracted from the matching self-operation cases. The CSO transmits a message 622 to request operation or configuration according to a proposed remedial action. The message 622 includes information indicating the reason, the issue, and the recommended remedial action. Depending on the remedial action that is proposed by the CSO, the OSS takes one or more of the following actions.

- The OSS sends a request 624 to resource management to scale out the virtual resources. The MANO confirms the request by returning a message 626. For example, the message 626 can confirm that the scaling out has been successfully performed, e.g., available resources and supported completion of the request.
- The OSS sends a request 628 to provision CM change to a network element or function. The request 628 does not require a special acknowledgment because subsequent verification provides feedback indicating the results of actions taken in response to the request 628.
- The OSS transmits a request 630 to request updates to user subscription records, software implemented on the user equipment, and the like via an interface with the OSS. Whenever a business subscription services (BSS) function detects a change of the user status, such as a change in a device status or a subscription status, the BSS triggers an experience management operation by sending a peer message to a management plane function. A message 632 is returned to acknowledge that the requested action has been performed, e.g., the requested software versions are available and the corresponding user equipment models have been upgraded to the latest version.

The OSS transmits a configuration management message 634 that is used to trigger traffic steering actions in a cell such as preemption of the cell, handover of certain user groups based on quality of service profiles, and the like. A message 636 is transmitted to the user equipment to inform the impacted users of the traffic steering action. For example, users with the same quality of service profile in the subscription data, the same model/version, or the same application type are informed of actions such as handover to another cell/slice, preemption of the current cell using network initiated slice reselection or other actions that required the user equipment to move to another cell/slice with a new MDD/NSSAI.

Some embodiments of the messages and operations 620, 622, 624, 626, 628, 630, 632, 634, 636 are performed according to the method 400 shown in FIG. 4.

Verification 638 of the proposed remedial action is then performed. As discussed herein, verification is performed on the basis of collected statistics such as key performance indicators are key quality indicators. The performance during a predetermined time interval after the remedial action is assessed relative to the performance prior to taking the remedial action to determine whether performance has improved, declined, or remain the same.

If the verification 638 indicates that the remedial action successfully resolved the root cause, the OSS transmits a message 640 to the EMS including instructions for removing or resetting the status flag.

If the verification 638 indicates that the remedial action did not successfully resolve the root cause, the proposed remedial action is rolled back. In the illustrated embodiment, rolling back the remedial action includes one or more of the following actions:

sending a request 642 to resource management to scale-in and returned to a previous virtual resource instantiation;

provisioning 644 a backup plan to return a configuration of the wireless communication system to a previous state; or requesting 646 and update of corresponding records back to a previous state.

Based on the results of the verification process the matching self-operation cases are updated 648 to include information indicating the outcome (e.g., the success or failure) of the remedial action.

In some embodiments, a set of information elements are used to convey information over various interfaces such as interfaces between elements in the wireless communication system 100 shown in FIG. 1. Table 2 lists data attributes that are related to the identification and resolution of issues that contribute to root causes of slice reselection requests due to an unsatisfied slice experience at one or more user equipment. The message numbers in the Interface column refer to the messages in FIG. 6 that include the corresponding data element.

TABLE 2

| Data element | Attribute | Definition | Remarks | Interface |
|---|---|---|---|---|
| Context | IssueID | As defined in Error! Reference source not found. | Examples of detection rules for different issues are given in Error! Reference source not found. | selfop-oss itf itf-N (when stateFlag = on) (message 616) |
| Administrative state | stateFlag | stateFlag = on stateFlag = off | Indicator for the cell/slice status. When stateFlag is on, this information will become a part of the context and further issues and related self-operation cases will be handled as discussed herein. | Itf-N (messages 616 and 640) |
| Action | recommended action | As below | As below | selfop-oss itf (message 612) |
| | action id or action name | action id = number action name = string action id is linked to the name | Examples of action names are disclosed herein. Actions can be accomplished by templates or metadata models that are specific to | Depending on the action id the interface could be for example as follows: Message 624 (scale-out): Os-Ma-Nfvo Message 628 (CM change): Itf-N |

TABLE 2-continued

| Data element | Attribute | Definition | Remarks | Interface |
|---|---|---|---|---|
| | | | the selected action. | Message 630 (updates to records): oss-bss itf Message 634 (traffic steering configs): itf-N and itf N1/2 |
| | result of recommended action | success or failure | Based on the verification process as described herein. | selfop-oss itf (message 648) |
| Verification | Measurement (counter id) to count number of cases when UEs request a slice reselection due to a specific unsatisfied factor per cell. | Measurement per unsatisfied factor with a corresponding counter, for example: counter 1: #of slice reselection requests reported with parameter 1 in the cell counter n: #of slice reselection requests reported with parameter n in the cell | Parameters 1 to n describe the unsatisfied factors that lead an UE to request a slice reselection as defined in Table 1 in [6]· | New counter Itf-N (included in message 638, optionally also in message 612) |
| | Number of Slice Reselection request per cell with ReasonTypeID = "current slice unsatisfied" | KPI = sum of all the counters as above | KPI calculated over all of the different unsatisfied factors per cell. Few examples of these factors are given in Error! Reference source not found. | New KPI (included in message 638, optionally also in message 612) |

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

defining a set of detection rules that identify at least one issue causing slice reselection requests for reallocation of a slice received by a network function virtualization (NFV) system from a user equipment based on information indicating reasons for the slice reselection requests and contexts of the slice reselection requests;

applying the set of detection rules to self-operation cases generated for the slice reselection requests to identify the at least one issue causing the slice reselection requests, wherein the self-operation cases comprise information indicating reasons, contexts, remedial actions, and results of the remedial actions for the slice reselection requests;

selecting a remedial action to address the at least one issue;

performing the remedial action to reconfigure the NFV system; and determining whether the remedial action successfully resolved the at least one issue.

2. The method of claim 1, wherein applying the set of detection rules, selecting the remedial action, and performing the remedial action are performed in response to one or more slice reselection requests associated with a same reason, a same slice, or a same cell supporting the slice exceeding a threshold number.

3. The method of claim 1, further comprising:

receiving the slice reselection requests in response to throughput for applications implemented by the user equipment falling below a throughput threshold, and wherein storing the self-operation cases comprises storing self-operation cases comprising information indicating that the reasons for the slice reselection requests are insufficient throughput.

4. The method of claim 1, further comprising:

filtering the self-operation cases based on a measure of similarity between the reasons and the contexts in the self-operation cases; and applying the set of detection rules to the filtered self-operation cases.

5. The method of claim 4, wherein applying the set of detection rules comprises applying a set of detection rules that are used to detect a corresponding set of issues based on properties of the filtered self-operation cases, and wherein the at least one issue causing the slice reselection requests comprises a subset of the set of issues for which a corresponding subset of the set of detection rules is satisfied.

6. The method of claim 5, further comprising:

adding identifiers of the subset of the set of issues to the filtered self-operation cases, and wherein selecting the remedial action comprises selecting a previously used remedial action based on the filtered self-operation cases in response to the remedial action in the filtered self-operation cases having successfully resolved previous issues that caused slice reselection requests.

7. The method of claim 6, wherein selecting the remedial action comprises at least one of selecting the remedial action based on a rule or escalating the selection to human intervention in response to the previously used remedial action in the filtered self-operation cases not having successfully resolved previous issues that caused slice reselection requests.

8. The method of claim 7, further comprising:

monitoring at least one performance indicator for a predetermined time interval after applying the selected remedial action to reconfigure the NFV system; and determining whether the selected remedial action was successful based on the at least one performance indicator.

9. An apparatus for implementation in a network function virtualization (NFV) system, the apparatus comprising:

a receiver to receive slice reselection requests for reallocation of a slice from a user equipment;

a memory configured to implement a database to store self-operation cases, wherein the self-operation cases comprise information indicating reasons, contexts, remedial actions, and results of the remedial actions for the slice reselection requests; and a processor to define a set of detection rules that identify at least one issue causing the slice reselection requests based on the self-operation cases, apply the set of detection rules to the self-operation cases to identify the at least one issue causing the slice reselection requests, select a remedial action to address the at least one issue, and determine whether the remedial action successfully resolved the at least one issue.

10. The apparatus of claim 9, wherein the processor is configured to apply the set of detection rules and generate the remedial action in response to one or more slice reselection requests associated with a same reason, a same slice, or a same cell supporting the slice exceeding a threshold number.

11. The apparatus of claim 9, wherein the receiver is to receive the slice reselection requests in response to throughput for applications implemented by the user equipment falling below a throughput threshold, and wherein the self-operation cases stored in the database comprise information indicating that the reasons for the slice reselection requests are at least one of insufficient throughput or bit rate, a latency increasing above a corresponding threshold, and deterioration of a key performance indicator or a service quality indicator.

12. The apparatus of claim 9, wherein the processor is configured to filter the self-operation cases based on a measure of similarity between the reasons and the contexts in the self-operation cases.

13. The apparatus of claim 12, wherein the processor is configured to apply the set of detection rules to the filtered self-operation cases, and wherein the set of detection rules are used to detect a corresponding set of issues for the self-operation cases based on properties of the filtered self-operation cases, and wherein the at least one issue comprises a subset of the set of issues for which a corresponding subset of the set of detection rules is satisfied.

14. The apparatus of claim 13, wherein the processor is configured to add identifiers of the subset of the set of issues to the filtered self-operation cases stored in the database; and wherein the processor is configured to select a previously used remedial action from the filtered self-operation cases in response to the previously used remedial action in the filtered self-operation cases having successfully resolved previous issues that caused slice reselection requests.

15. The apparatus of claim 14, wherein the processor is configured to select the remedial action based on a rule or to escalate the selection to human intervention in response to the previously used remedial action in the filtered self-operation cases not having successfully resolved the previous issues that caused slice reselection requests under context having the measure of similarity to the contexts of the at least one issue causing the slice reselection requests.

16. The apparatus of claim 15, wherein the processor is configured to monitor at least one performance indicator for a predetermined time interval after applying the selected remedial action to reconfigure the NFV system and determine whether the selected remedial action was successful based on the at least one performance indicator.

17. The apparatus of claim 16, wherein the processor is configured to modify the filtered self-operation cases stored in the database to incorporate information identifying the selected remedial action and information indicating whether the remedial action was successful.

18. An apparatus comprising:

at least one processor; and at least one memory storing executable instructions, wherein the instructions are configured to, when executed by the at least one processor, cause the apparatus to:

define a set of detection rules that identify at least one issue causing slice reselection requests for reallocation of a slice received by a network function virtualization (NFV) system from a user equipment based on information indicating reasons for the slice reselection requests and contexts of the slice reselection requests;

apply the set of detection rules to self-operation cases generated for the slice reselection requests to identify the at least one issue causing the slice reselection requests, wherein the self-operation cases comprise information indicating reasons, contexts, remedial actions, and results of the remedial actions for the slice reselection requests;

select a remedial action to address the at least one issue;

perform the remedial action to reconfigure the NFV system; and determine whether the remedial action successfully resolved the at least one issue.

19. The apparatus of claim 18, wherein the apparatus being caused to apply the set of detection rules, select the remedial action, and perform the remedial action is in response to one or more slice reselection requests associated with a same reason, a same slice, or a same cell supporting the slice exceeding a threshold number.

20. The apparatus of claim 18, wherein the instructions are further configured to, when executed by the at least one processor, cause the apparatus to:

monitor at least one performance indicator for a predetermined time interval after applying the selected remedial action to reconfigure the NFV system; and determine whether the selected remedial action was successful based on the at least one performance indicator.

* * * * *